Figure 1:
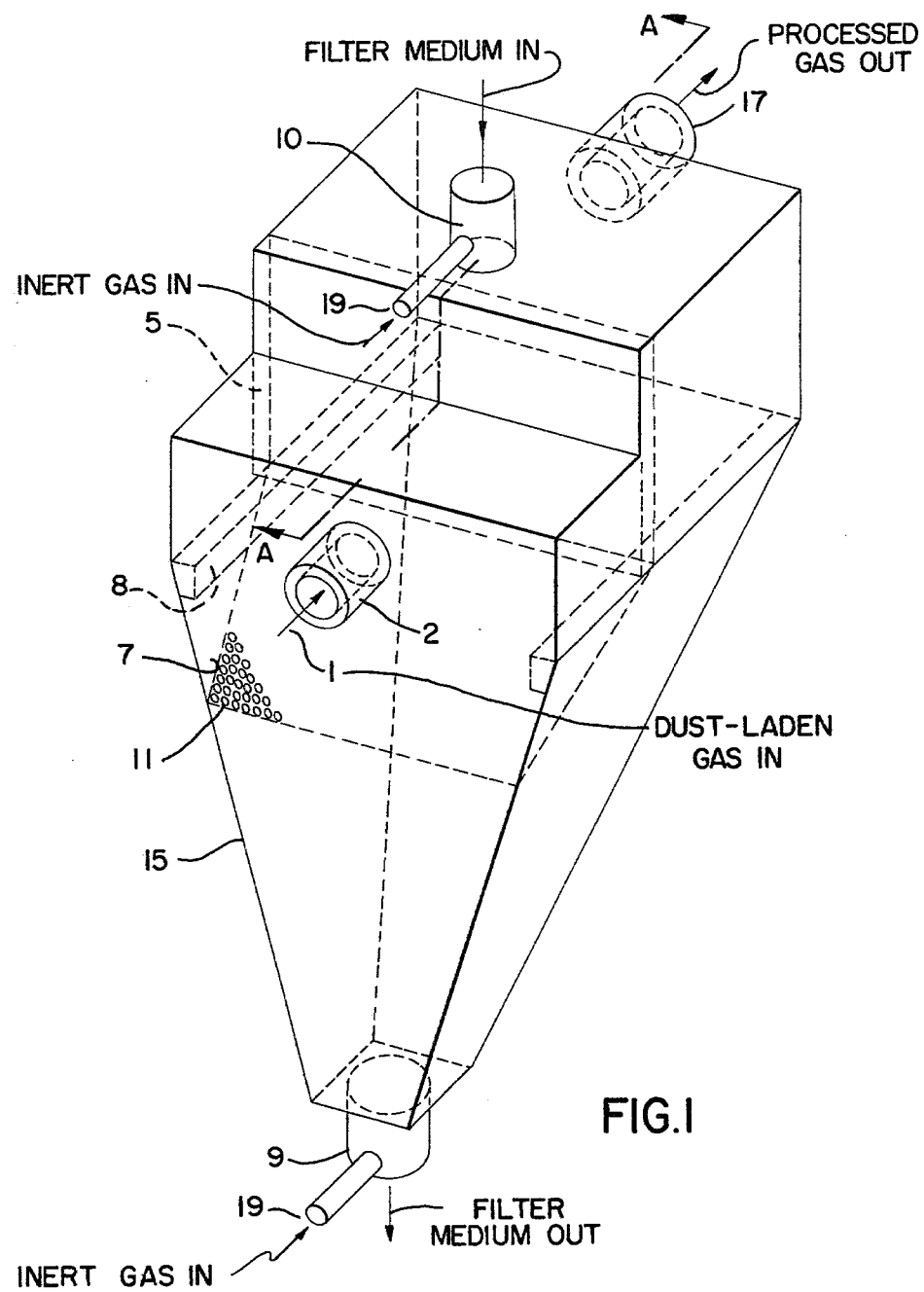

United States Patent [19]

Pforr et al.

[11] 4,324,570
[45] Apr. 13, 1982

[54] APPARATUS FOR DE-DUSTING GASES

[75] Inventors: Gerhard Pforr, Ludwigshafen; Gerhard Peschau, Frankenthal; Guenter Schippmann, Mannheim; Max Appl, Dannstadt-Schauernheim; Erfried Voelkl, Frankenthal; Hans Stark, Bobenheim-Roxheim, all of Fed. Rep. of Germany

[73] Assignee: BASF Aktiengesellschaft, Ludwigshafen, Fed. Rep. of Germany

[21] Appl. No.: 143,444

[22] Filed: Apr. 24, 1980

[30] Foreign Application Priority Data

May 10, 1979 [DE] Fed. Rep. of Germany ....... 2918779

[51] Int. Cl.³ ............................................. B01D 46/30
[52] U.S. Cl. ........................................ 55/267; 55/479;
422/176; 422/177; 422/218; 422/241
[58] Field of Search ................. 55/267, 474, 479, 512,
55/516, 517; 422/176, 177, 181, 213, 216, 218,
220, 241

[56] References Cited

U.S. PATENT DOCUMENTS

| 1,766,221 | 6/1930 | Lynch | 55/479 |
| 3,202,486 | 8/1965 | Versluis | 422/241 |
| 3,273,320 | 9/1966 | Delaune et al. | 55/267 |
| 3,685,262 | 8/1972 | Kressley | 55/474 |
| 4,192,659 | 3/1980 | Kiang | 55/267 |

FOREIGN PATENT DOCUMENTS

| 419764 | 10/1925 | Fed. Rep. of Germany | 55/474 |
| 862149 | 11/1952 | Fed. Rep. of Germany | 422/216 |
| 1136898 | 9/1962 | Fed. Rep. of Germany | 55/512 |
| 2254162 | 5/1978 | Fed. Rep. of Germany . | |
| 2552298 | 5/1978 | Fed. Rep. of Germany . | |

Primary Examiner—David L. Lacey
Attorney, Agent, or Firm—Keil & Witherspoon

[57] ABSTRACT

De-dusting of gases is carried out in an apparatus containing a granular-bed filter, the pourable granular filter medium flowing downward through the bed. The apparatus comprises a vessel of rectangular cross-section with a vertical side wall (4) extending from the top to the bottom. A partition (5), arranged parallel to the side wall (4), extends from the upper end of the vessel into the interior of the vessel. The remaining three side walls of the vessel extend - at least starting from a level corresponding to the lower end of the partition (5), taperingly downward to the outlet (9). The partition (5) is supported by the two walls adjacent to the vertical wall and forms, together with these and with the talus (7) of the filter medium, which arises at the lower end of the partition, a chamber (3) into which the inlet (2) for the gas to be purified opens. At the inlet (10) for the filter medium, located at the upper end of the partition, a further talus (12) of the filter medium forms, defining a collecting chamber (16), in which the outlet (17) for the purified gas is located.

4 Claims, 2 Drawing Figures

APPARATUS FOR DE-DUSTING GASES

The present invention relates to an apparatus for de-dusting gases, using a granular-bed filter.

Gaseous reaction product of reactions of solids as a rule entrain solid dusts. The dust content of such process gases in general interferes with the further processing of the gases and must therefore be removed. The de-dusting of such gases constitutes a problem which hitherto has not been solved satisfactorily, where the process gas contains corrosive constituents, whether these be the desired product itself or by-products, especially if the process gas is formed at a high temperature.

The de-dusting of gases using granular-bed filters is known per se and a variety of apparatus based on this principle has been disclosed, for example in German Published Applications DAS No. 2,254,162 and DAS No. 2,552,298. According to these, the gas to be de-dusted may be led in counter-current to the direction of flow of the filter material, or at right angles thereto. In order to achieve very uniform exposure of the granular-bed filter to the gas over the entire cross-section of the bed, the apparatus possesses an internal structure which is intened to produce the desired distribution of the gas stream undergoing purification. A feature common to the apparatus hitherto disclosed for de-dusting gases by granular-bed filters is that the components, which for reasons of mechanical stability are in most cases made of metals, are insufficiently corrosion-resistant and that, because of their complicated construction, it is very difficult, if not impossible, to protect them by applying a coating of a corrosion-resistant material. For this reason, apparatus comprising granular-bed filters has hitherto only been used to a very limited extent, if at all, for de-dusting process gases which, in particular, are hot and still contain corrosive constituents.

It is an object of the present invention to provide an apparatus for de-dusting gases, using a granular-bed filter, which, on the one hand, ensures uniform distribution of gas over the entire bed while, on the other hand, the components which come into contact with the gas, in particular the components which support the bed, are so designed that they can, without constructional difficulties, be lined with plane panels of corrosion-resistant materials and that, furthermore, continuous de-dusting of the gases is feasible even when removing dust-laden filter medium and recharging the apparatus with fresh filter medium.

We have found that this object is achieved by an apparatus which comprises a vessel of rectangular cross-section, having a vertical side wall and a partition which protrudes into said vessel from the upper end thereof and is also vertical and parallel to said wall, and three further side walls which taper, at least starting from the level of the lower end of said partition, downward to the outlet of the vessel, said partition being supported by the two walls adjacent to said vertical wall and forming, together with the plane talus of the filter medium, formed at the lower edge of said partition, a chamber into which the inlet for the gas to be purified opens, and an inlet, located at the upper end of said partition, for the filter medium, at which inlet a further talus of the filter medium forms, through which the purified gas issues from the granular bed into a collecting chamber on which is provided an outlet for the purified gas.

The apparatus according to the invention will be explained in relation to the accompanying drawing FIG. 1 is a schematic perspective view of a preferred embodiment of such an apparatus, which serves primarily to show the overall outward appearance of the apparatus and indicates along what line the detailed cross-sectional representation of FIG. 2 has been taken. The walls of the apparatus, while in fact multi-layered, have been represented in the schematic showing of FIG. 1 in single-line fashion but much of the interior of the apparatus has been indicated in FIG. 1 in dashed lines, and FIG. 2 is a detailed vertical section of the apparatus, taken along line A—A of FIG. 1.

Figure 2:
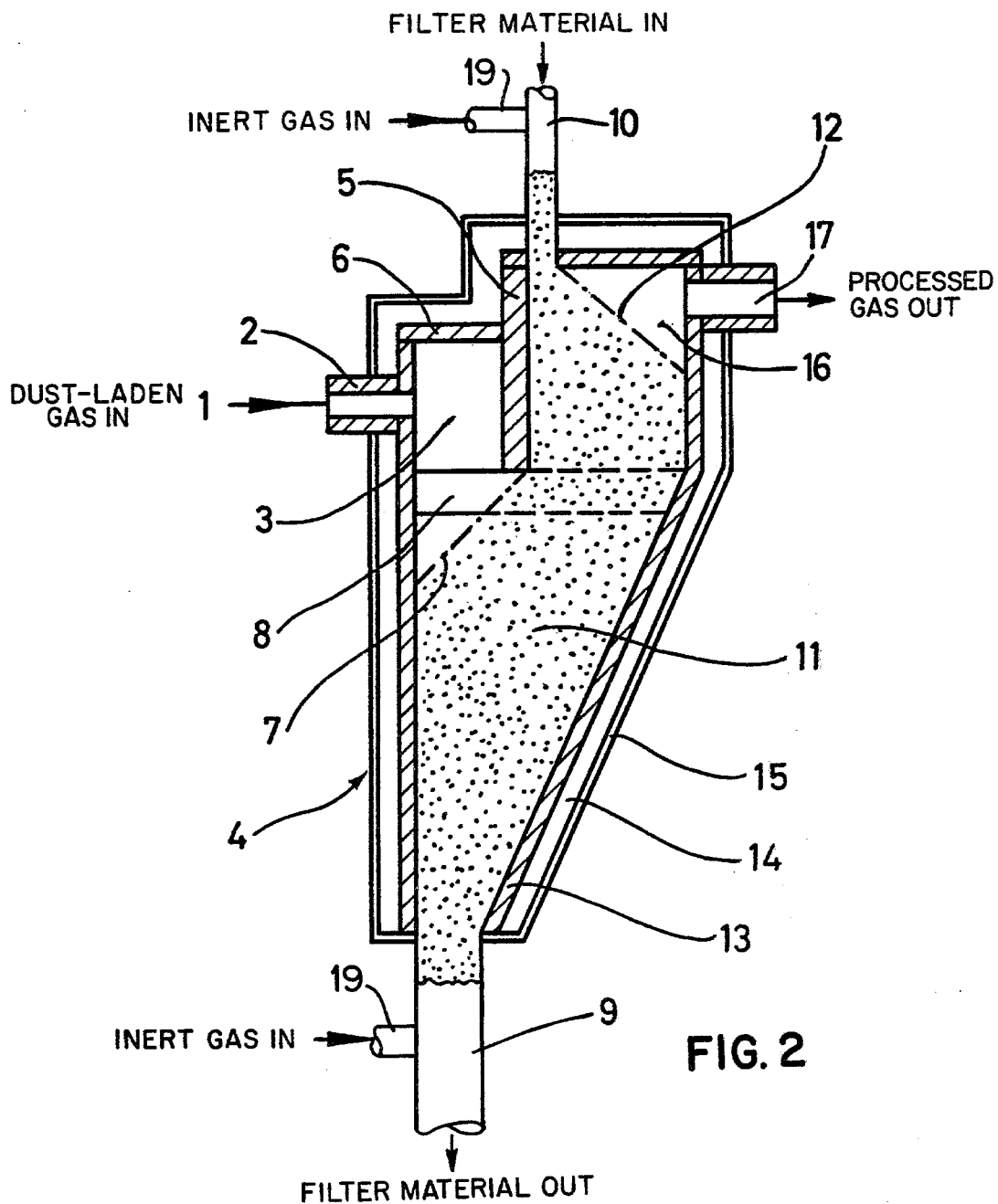

The gas to be purified is fed to the inlet nozzle 2 FIGS. 1 and 2, through line 1 and from the nozzle enters the chamber 3. This chamber is formed by the vertical side wall 4, in which the inlet nozzle 2 is located, and by the partition 5 which is opposite this wall and protrudes from the upper end of the vessel into the interior of the vessel. The term "vertical side wall" is meant to refer to the portion of the enclosure on the left side of FIG. 2 which extends straight downwardly from the horizontal shoulder formed at the top thereof: It is in part of straight downwardly extending portion that the side wall, on its inside is in contact with, and thus contains, the filter medium 11. At the top, the chamber is closed by the cover 6, while at the bottom it is bounded by the talus 7 of the filter medium. The lateral boundaries are formed by the side walls which adjoin the vertical wall, and thus lie parallel to the plane of the drawing of FIG. 2 and are not illustrated in this Figure but are visible in FIG. 1. As also not illustrated in the Figures, the partition 5 can be supported by projections fixedly connected to the side walls. Another possibility is illustrated in the Figures, where the partition is supported by two beams 8 which are located along the two side walls which are parallel to the plane of the drawing, FIG. 2, the beams also being anchored to the other two walls.

The three additional side walls which form the upper part of the vessel are also vertical in the region of the partition 5 but from the level of the lower edge of the partition 5 they taper conically toward the outlet 9 located in the lower part of the vessel.

An inlet tube 10 for the granular filter medium 11 is located in the upper part of the vessel, on the side of the partition 5 which is opposite the chamber. The tube is advantageously located in the immediate vicinity of the partition and substantially centrally. After the filter medium has been introduced through the inlet tube, a talus 12 forms. Both talus 7 and talus 12 are indicated in FIG. 2 by dot-dash lines; talus 7 is also indicated in FIG. 1. If a circular tube is used, this talus, the slope of which corresponds to the angle of repose of the particular material, is curved in the shape of a cone which is bounded or intersected by the dividing plate 5 and the side walls (ie. the walls which lie parallel to the plane of the drawing, FIG. 2).

The apparatus according to the invention is bounded by plane surfaces, so that, if the nature of the gas to be purified demands it, the inner walls can without difficulty be lined with a corrosion-resistant material which itself consists of simple plate-shaped components. As a result, it is possible to use lining materials which on the one hand are corrosion-resistant while on the other hand, because of their particular mechanical properties, they could not be used to produce complicated curved or otherwise shaped mechanically stable components; examples of such materials are glass and quartz.

FIG. 2 shows the construction of the side walls were corrosive gases, which may or may not be hot, are to be treated. In this case, the side wall structure of the apparatus according to the invention is built up of three layers.

The lining (13) on the inner wall consists of plane sheets of a corrosion-resistant material, for example glass which is resistant to temperature changes, or quartz. A heat-insulating layer (14), for example of foamed glass or quartz glass, against which the sheets of corrosion-resistant material rest tightly and are therefore effectively protected against mechanical stresses. Externally, the insulating layer is surrounded by components 15 of a load-bearing material, for example a ferrous metal such as steel or the like, which is effectively protected against corrosion by the inner layers.

To operate the apparatus according to the invention, it is first filled—with the outlet orifice 9 closed—with a pourable granular filter medium, resulting in the formation of the plane talus 7 and curved talus 12 already described above. The dust-laden waste gas first enters the chamber 3 and then passes through the talus 7 into the granular-bed filter 11; it flows through this in the direction of the talus 12, is collected in the collecting chamber 16 and leaves the apparatus in a dust-free condition through the nozzle 17. The dust is deposited in the filter bed and results in a continuous increase in the pressure drop of the process gas between the point of entry into the filter bed and the point of exit. The pressure drop can be utilized to open the outlet 9 if it exceeds a predetermined value, so as to discharge the dust-laden filter medium. While this is taking place, the dust-laden fitler medium located between the lower plane talus 7 and the upper curved talus 12 slides into the conically tapering lower part of the vessel while fresh filter medium slides into the apparatus, from a stock vessel not shown in the Figures, through the inlet nozzle 10. The filter medium continues to be drawn off until the pressure loss has dimenished to the original value. Only a few minutes are needed to draw off the dust-laden filter medium. The outlet is then closed again. Several hours are needed for the filter medium to become dust-laden, the exact time depending on the dust content of the gas to be purified. A further advantage of the apparatus according to the invention is that it can continue to operate even while the filter medium is being changed, ie. its operation is completely continuous.

In order to make sure that no gas has escaped through the inlet for fresh filter medium and the outlet for dust-laden filter medium, inert gases can be introduced through both lines 19. This takes place during the operation of the apparatus, ie. both while the filter medium is being dust-laden, and while it is being drawn off. The inert gas enters the collecting chamber 16 together with the purified gas, and is drawn off through the nozzle 17.

In the case of gases which contain sublimable compounds, for example process gases from the synthesis of aluminum chloride, which are formed on chlorinating bauxite or alumina in the presence of reducing agents, eg. carbon or carbon monoxide, and which contain aluminum chloride as a sublimable compound, it is undesirable that the sublimable compound precipitates in the filter apparatus. In that case, the inert gases can be heated.

When de-dusting corrosive and hot gases, it is necessary not only that the inner wall of the apparatus according to the invention should consist of a heat-resistant and corrosion-resistant material, but that the filter medium should also conform to these requirements. Furthermore, the filter medium must be flowable or pourable under the operating conditions. Examples of suitable filter media are quartz sand, quartz grit, granular carbon, pumice chips, or sands or grit or other corrosion-resistant material.

When treating gases which contain constituents which condenses or desublime at a low temperature the wall temperature must not drop below the temperature of the gas, so that the outer walls should advantageously be insulated by providing insulating layers as already described above. These insulating layers, which are located along the inner surfaces of the outer walls at the same time serve as carriers for the inner lining of corrosion-resistant material. The components, which are in the form of plane sheets, need not be sealed at their joints. This is because dust particles from the gas deposit in the gaps between the individual components, thus reduce the passage of gas through the gap, and accordingly produce a degree of sealing even within the insulating layer. Hot gases, which may or may not be corrosive, at the worst reach the outer load-bearing jacket, consisting of metallic materials, only very slowly by diffusion, cool greatly over their path to this jacket, and can thus only cause slight heating of the jacket. The process gases resulting from the synthesis of aluminum chloride, which are at from about 250° to 400° C., have a very corrosive effect on metallic materials, for example steel, because of their chlorine and phosgene content. Nevertheless, the outer jacket of the apparatus according to the invention can be made of steel since the jacket rises to not more than 50° C. At this temperature, normal steel is completely resistant to chlorine and phosgene.

Summarizing, the apparatus according to the invention is particularly suitable for de-dusting corrosive gases, since its inner walls can be lined in a simple manner with plane sheets of corrosion-resistant material. The apparatus can be operated continuously, even when the dust-laden filter medium must be replaced by fresh filter medium. As a result of the good distribution of the gas, the filter bed becomes uniformly laden with dust, and is thus efficiently utilized.

We claim:

1. Apparatus for de-dusting hot and corrosive gases including a granular-bed filter having a pourable granular filter medium which flows downward through the bed from a filter medium inlet to a filter medium outlet, said apparatus comprising:

a vessel of rectangular cross-section, having a vertical side wall extending continuously downward to said filter medium outlet, a partition which protrudes into said vessel from the upper end thereof and is also vertical and parallel to said said wall, and three further side walls which taper, at least starting from the level of the lower end of said partition, downward to said filter medium outlet of said vessel, said four side walls on their inside comprising respective plane panels of corrosion resistant material, said filter medium inlet being located in a vertical plane on one side of said partition and generally centrally of the upper part of said vessel, said filter medium outlet being located in a vertical plane on the other side of said partition, said filter medium extending in said vessel along a generally S-shaped path between said filter medium inlet and said filter medium outlet, producing on said other side a first talus at the lower edge of said partition and producing on said one side a second talus at the lower edge of said filter medium inlet, a gas inlet and a gas entrance chamber, both being formed on said other side of the partition, a gas collecting chamber and a gas outlet, both being formed on said one side of the partition, the gas to be purified passing from said gas inlet generaly downwardly by way of said entrance chamber and said first talus into said fluid medium, and the purified gas passing out of said fluid medium generally upwardly by way of said second talus and said collecting chamber into said gas outlet.

2. An apparatus as claimed in claim 1, wherein said partition has a horizontal bottom edge and wherein there are provided means attached to the inside of the side walls adjacent said vertical wall for supporting said partition at said edge.

3. An apparatus as claimed in claim 1 or 2, wherein each of the side walls of the vessel is of a three-layer construction, the inner layer of each said wall comprising said plane panel of corrosion-resistant material, said panel resting on an intermediate layer of a porous material which is also corrosion-resistant, and said intermediate layer being supported by an outer layer of a metallic material.

4. Apparatus for de-dusting gases including, a granular-bed filter having a pourable granular filter medium which flows downward through the bed from a filter medium inlet to a filter medium outlet, said apparatus comprising:

a vessle of rectangular cross-section, having a vertical side wall extending continuously downward to said filter medium outlet, a partition which protrudes into said vessel from the upper end thereof and is also vertical and parallel to said side wall, and three further side walls which taper, at least starting from the level of the lower end of said partition, downward to said filter medium outlet of said vessel, said filter medium inlet being located in a vertical plane on one side of said partition and generally centrally of the upper part of said vessel, said filter medium outlet being located in a vertical plane on the other side of said partition, said filter medium extending in said vessel along a generally S-shaped path between said filter medium inlet and said filter medium outlet, producing on said other side a first talus at the lower edge of said partition and producing on said one side a second talus at the lower edge of said filter medium inlet, a gas inlet and a gas entrance chamber, both being formed on said other side of the partition, a gas collecting chamber and a gas outlet, both being formed on said one side of the partition, the gas to be purified passing from said gas inlet generally downwardly by way of said entrance chamber and said first talus into said fluid medium, and the purified gas passing out of said fluid medium generally upwardly by way of said second talus and collecting chamber into said gas outlet.

* * * * *